United States Patent Office 2,913,325
Patented Nov. 17, 1959

2,913,325

AMYL-N,N-DIETHYLTHIOLCARBAMATE AND USE AS HERBICIDE

Harry Tilles, El Cerrito, Calif., and August B. Lindquist, Maitland, Fla., assignors to Stauffer Chemical Company, a corporation of Delaware No Drawing. Application January 25, 1956
Serial No. 561,370

3 Claims. (Cl. 71—2.7)

This invention relates to a certain novel composition of matter, the method of making the composition, and the use of the composition as an herbicide. More particularly, it has been found that n-amyl N,N-diethylthiolcarbamate (hereinafter sometimes referred to as R-1431) has valuable herbicidal properties and is particularly useful as a pre-emergence herbicide.

The following illustrative example demonstrates the method which may be employed to make the compounds of the present invention. In the examples, all parts are by weight.

*Example 1 (R–1431).*—About 5.8 parts (0.24 mole) of sodium hydride is placed in a reactor which has been flushed with nitrogen. To this is added 172 parts toluene, and 27 parts (0.26 mole) of 1-pentanethiol is added dropwise at room temperature. The mixture is then heated to reflux temperature, the heat is turned off and 36.6 parts (0.27 mole) of diethylcarbamyl chloride is added over a period of several minutes. The heat of reaction is sufficient to keep the toluene refluxing. The mixture is then refluxed with stirring for five hours, cooled, 100 parts of water carefully added under nitrogen and the water layer is then discarded. The toluene solution is then washed with two 100 part portions of 2% aqueous sodium hydroxide, three 100 part portions of water, dried over magnesium sulfate, filtered and the solvent evaporated. There is obtained 38.2 parts (72.5% yield) of n-amyl N,N-diethylthiolcarbamate ($n_D^{24.5}$ 1.4783). Instead of using sodium hydride as a starting material, one can use finely divided metallic sodium.

The compounds of the present invention have been extensively tested as herbicides and have been particularly evaluated as pre-emergence herbicides. Pre-emergence herbicides are ordinarily used by placing a narrow band of the herbicide over the center of a seeded crop row at time of planting or before the crop emerges. If the herbicide is harmless to the desired crop, seeds or seedlings, but phytotoxic to the weed seeds or seedlings most frequently encountered, the crop grows in an almost weed-free environment. Of course, the pre-emergence herbicide may be used over the entire field, but it is normally used in a narrow band which straddles the crop row and the balance of the weeds are controlled by various cultivation methods. The herbicides of the present invention are selective toward small seeded annual grasses and broad-leafed plants, and so are effective against the most common weeds but have little effect on such valuable row crops such as corn and beans. The phytocidal composition may be applied to the soil in any convenient form. For instance, it can be dissolved in a solvent, such as acetone, or emulsified and sprayed onto the soil or it can be combined with a dry inert carrier and applied as a dust or as granules. Although the composition may be applied to an entire crop plot, it is generally preferred to apply it in a narrow band, say 6", over the seeded row of a newly planted crop. Generally, rates of application of from one-half to twenty pounds per acre of actual area treated will be found suitable.

The following example shows the effect of R-1431 when used to protect corn from weeds:

*Example 2.*—A field test consisted of applying the compound at the rate of 1, 2, 4, 8 and 10 pounds/80 gallons/acre as pre-emergence treatments to corn. The compound was dissolved in a small amount of acetone dispersed in water and applied at the desired rate by mounting a spray nozzle behind the planter packer wheel. A 6" band was applied and the rates of application are on the basis of the area of actual application and not on the total area of the plot treated. The weather was sunny, the air temperature 70° F., the soil temperature was 78°, and the seed bed was in good tilth and very dry. Immediately after the test, the plots were sprinkler irrigated. Each treatment was replicated three times. Before the test, the entire area had been seeded with rye and oats and dead nettle seeds were present in the soil. In each case, the growth of the corn was normal in comparison with check plots. The following data were obtained:

TABLE I

*Results 16 days after application*

| | Rate A, lb. | Corn Stand [1] | | | | Rye [2] | | | |
|---|---|---|---|---|---|---|---|---|---|
| | | I | II | III | Av. | I | II | III | Av. |
| R-1431 | 1 | 7 | 9 | 8 | 8.0 | 80 | 80 | 90 | 83 |
| | 2 | 12 | 14 | 8 | 11.3 | 100 | 100 | 100 | 100 |
| | 4 | 9 | 9 | 11 | 9.6 | 100 | 100 | 100 | 100 |
| | 8 | 11 | 10 | 9 | 10.0 | 100 | 100 | 100 | 100 |
| | 10 | 11 | 11 | 8 | 10.0 | 100 | 100 | 100 | 100 |
| Check | 0 | 9 | 6 | 11 | 8.6 | 0 | 0 | 0 | 0 |

| | | Oats [2] | | | | Dead Nettle [2] | | | |
|---|---|---|---|---|---|---|---|---|---|
| R-1431 | 1 | 0 | 0 | 0 | 0 | 90 | 100 | 100 | 96 |
| | 2 | 70 | 50 | 50 | 63 | 100 | 100 | 100 | 100 |
| | 4 | 90 | 95 | 90 | 91 | 100 | 100 | 100 | 100 |
| | 8 | 100 | 100 | 100 | 100 | 100 | 100 | 100 | 100 |
| | 10 | 100 | 100 | 100 | 100 | 100 | 100 | 100 | 100 |
| Check | 0 | 0 | 0 | 0 | 0 | 0 | 0 | 0 | 0 |

[1] Corn stand—number of plants/10 ft. of row.
[2] Percent control of weeds.

We claim:

1. As a new compound, n-amyl N,N-diethylthiolcarbamate.

2. The method of combatting weeds comprising applying a phytotoxic concentration to the soil of n-amyl N,N-diethylthiolcarbamate.

3. The method of claim 2 wherein the compound is applied to a narrow band of a row crop at a rate of from one-half to twenty pounds per acre of area actually treated.

References Cited in the file of this patent

UNITED STATES PATENTS

| 2,060,733 | Hunt et al. | Nov. 10, 1936 |
| 2,160,880 | Loane et al. | June 6, 1939 |
| 2,212,895 | Allen | Aug. 27, 1940 |
| 2,562,011 | Baumgartner | July 24, 1951 |
| 2,636,816 | Stewart | Apr. 28, 1953 |
| 2,642,451 | Weijlard et al. | June 16, 1953 |
| 2,650,876 | Stewart | Sept. 1, 1953 |
| 2,687,348 | Kosmin | Aug. 24, 1954 |
| 2,723,989 | Harman | Nov. 15, 1955 |

FOREIGN PATENTS

| 688,726 | Great Britain | Mar. 11, 1953 |

OTHER REFERENCES

Riemschneider et al.: Monatshefte für Chemie, 84, 518–21 (1953).